United States Patent [19]

Murakami et al.

[11] 3,999,448
[45] Dec. 28, 1976

[54] POWER TRANSMISSION FOR MOTOR DRIVEN VEHICLES

[75] Inventors: Noboru Murakami, Nagoya; Koichiro Hirozawa, Kariya; Kazuo Obara; Koichi Matsuo, both of Toyota, all of Japan

[73] Assignee: Aisin Seiki Kabushiki Kaisha, Kariya, Japan

[22] Filed: Dec. 13, 1974

[21] Appl. No.: 532,643

[30] Foreign Application Priority Data

Dec. 21, 1973 Japan ............... 48-1390

[52] U.S. Cl. .................... 74/759; 74/753
[51] Int. Cl.² ..................... F16H 57/10
[58] Field of Search .......... 74/753, 759, 761, 763, 74/765

[56] References Cited

UNITED STATES PATENTS

| | | | |
|---|---|---|---|
| 3,339,431 | 9/1967 | Croswhite et al. | 74/763 X |
| 3,736,815 | 6/1973 | Ito et al. | 74/759 |
| 3,823,622 | 7/1974 | Mori et al. | 74/759 |
| 3,877,320 | 4/1975 | Iijima | 74/759 |

*Primary Examiner*—Benjamin W. Wyche
*Assistant Examiner*—Lance W. Chandler
*Attorney, Agent, or Firm*—Finnegan, Henderson, Farabow & Garrett

[57] ABSTRACT

Power transmission for motor-driven vehicles which comprises an input shaft and an output shaft rotatable about a common axis; a gear mechanism including a first planetary gear set having a first sun gear rotatably supported about said common axis, a first ring gear co-axial with and rotatable about said first sun gear and first planetary gear means including first planetary gears engaging the first sun gear and the first ring gear and a first planetary carrier supporting said first planetary gears and rotatable about said common axis; a second planetary gear set having a second sun gear rotatably supported about said common axis, a second ring gear co-axial with and rotatable about said second sun gear and connected with said first sun gear and second planetary gear means including second planetary gears engaging the second sun gear and the second ring gear and a second planetary carrier rotatably supporting said second planetary gears, said second planetary carrier being connected with the first planetary carrier; and a third planetary gear set having a third sun gear rotatably supported about said common axis and connected with said second sun gear, a third ring gear co-axial with and rotatable about said third sun gear and connected with said output shaft, and third planetary gear means including inner third planetary gears engaging the third sun gear, outer third planetary gears engaging the inner third planetary gears and the third ring gear, and a third planetary carrier rotatable about said common axis and rotatably supporting said inner and outer third planetary gears, said third planetary carrier being connected with said first ring gear. Clutch means and brake means are also combined with the gear mechanism so that desired speed changing stages can be obtained through selective actuation thereof.

65 Claims, 8 Drawing Figures

POWER TRANSMISSION FOR MOTOR DRIVEN VEHICLES

The present invention relates to a power transmission for motor driven vehicles, and more particularly to a power transmission which is suitable for use in combination with fluid coupling means.

In general, in large motor driven vehicles such as trucks and buses, it is desirable that they are equipped with power transmission means having at least four speed changing stages. For this purpose, it has already been proposed to make use of gear means having three or four combined sets of planetary gear mechanisms in which one or more elements of the planetary gear mechanism are selectively restrained against rotation by suitable friction means such as clutches and brakes so as to provide desired speed changing ratios. There are very many varieties of combinations of planetary gear mechanisms for providing four or more speed changing stages, however, it is desirable that a resultant power transmission meets the following requirements.

i. The output shaft of the transmission must be connected with the same element of the gear means in all of the speed changing stages.

ii. The rotating speed of each element in the gear means should be as low as possible so that the linear speed of the element at the bearing portion can be maintained at a minimum value.

iii. The load on teeth of each gear element should be as low as possible.

iv. In each planetary gear set, each gear should have number of teeth which is more than a required minimum number for providing proper meshing.

v. The elements of the planetary gear sets can readily be connected together with minimum length of connection.

vi. Any up-shifting or down-shifting of the gear mechanism should be performed through actuation of a single friction means so that shock caused by such a shifting operation can be reduced.

It is therefore an object of the present invention to provide a novel power transmission having at least four forward drive speed ratios and at least one reverse drive speed ratio.

Another object of the present invention is to provide a novel power transmission which meets the aforementioned requirements.

Still further object of the present invention is to provide a power transmission for a motor driven vehicle, which includes a novel combination of planetary gear mechanisms.

According to the present invention, there is provided a power transmission for a motor driven vehicle, which comprises an input shaft and an output shaft rotatable about a common axis; a gear mechanism including a first planetary gear set having a first sun gear rotatably supported about said common axis, a first ring gear co-axial with and rotatable about said first sun gear and first planetary gear means including first planetary gears engaging the first sun gear and the first ring gear and a first planetary carrier supporting said first planetary gears and rotatable about said common axis; a second planetary gear set having a second sun gear rotatably supported about said common axis, a second ring gear co-axial with and rotatable about said second sun gear and connected with said first sun gear and second planetary gear means including second planetary gears engaging the second sun gear and the second ring gear and a second planetary carrier rotatably supporting said second planetary gears, said second planetary carrier being connected with the first planetary carrier; and a third planetary gear set having a third sun gear rotatably supported about said common axis and connected with said second sun gear, a third ring gear co-axial with and rotatable about said third sun gear and connected with said output shaft, and third planetary gear means including inner third planetary gears engaging the third sun gear, outer third planetary gears engaging the inner third planetary gears and the third ring gear, and a third planetary carrier rotatable about said common axis and rotatably supporting said inner and outer third planetary gears, said third planetary carrier being connected with said first ring gear. In order to provide connection between the input shaft and the gear mechanism, it is a further feature of the invention to provide means for selectively connecting the input shaft with at least one of the interconnected first ring gear and the third planetary carrier, the interconnected first and second planetary carriers, and the interconnected first sun gear and the second ring gear. Means is further provided for restraining the rotation of at least one of the second ring gear which is connected with the first sun gear, the second planetary carrier which is connected with the first planetary carrier, the interconnected second and third sun gears, and the third planetary carrier which is connected with the first ring gear.

According to a further feature of the present invention, a fourth planetary gear set may be combined with the gear mechanism for providing an increased number of speed changing stages. The elements of the fourth planetary gear set may be connected with the elements of the gear mechanism in various ways.

The above and other objects and features of the present invention will become apparent from the following embodiments of preferred embodiments taking reference to the accompanying drawings, in which.

Figure 1:
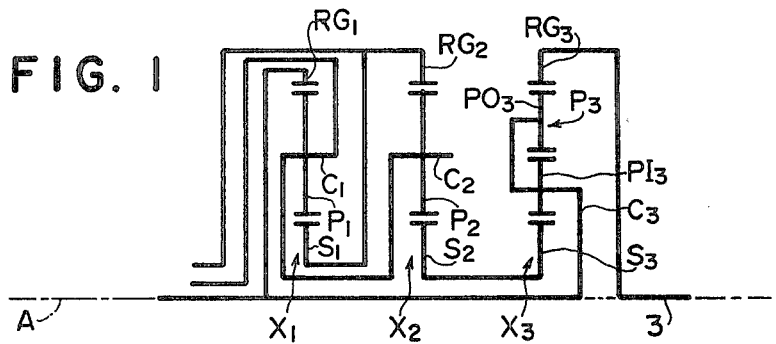
FIG. 1 is a diagrammatical illustration of a gear mechanism used in the present invention.

Referring now to the drawings, particularly to FIG. 1, there is shown a gear mechanism 1 which is used in the transmission of the present invention. The gear mechanism 1 comprises a first planetary gear set X1 including a first sun gear S1 rotatable about an axis A, a first ring gear RG1 co-axial with and rotatable about the first sun gear S1 and suitable number of first planetary gears P1 which engages with the first sun gear S1 and the first ring gear RG1. The planetary gears P1 are rotatably supported by a first planetary carrier C1 which is rotatable about the common axis A. The gear mechanism 1 also comprises a second planetary gear set X2 including a second sun gear S2 rotatable about the common axis A, a second ring gear RG2 and suitable number of planetary gears P2 engaging the second sun gear S2 and the second ring gear RG2. The second planetary gears P2 are rotatably supported by a second planetary carrier C2 which is rotatable about the common axis A and connected with the first planetary carrier C1. The second ring gear RG2 is connected with the first sun gear S1. The gear mechanism 1 further comprises a third planetary gear set X3 including a third sun gear S3 rotatable about the common axis A, a third ring gear RG3 co-axial with and rotatable about the third sun gear S3, and third planetary gear means P3 having inner third planetary gears PI3 engaging the third sun gear S3 and outer third planetary gears PO3 engaging the inner planetary gears PI3 and the third ring gear RG3. The planetary gears PI3 and PO3 are rotatably supported by a third planetary carrier C3 which is rotatable about the common axis A. The third sun gear S3 is connected with the second sun gear S2 and the third planetary carrier C3 is connected with the first ring gear RG1.

Figure 1A:
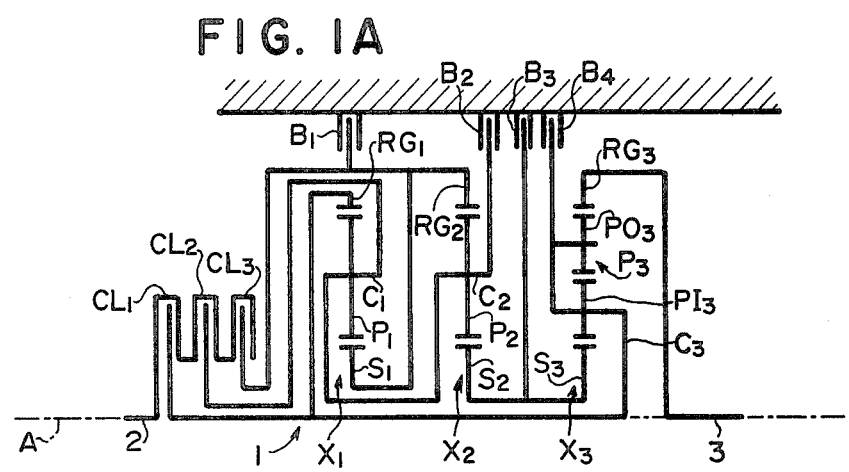
FIG. 1A is diagrammatical view of a power transmission in accordance with one embodiment of the present invention.

Referring now to FIG. 1A, there is shown a transmission employing the gear mechanism shown in FIG. 1. In the illustrated embodiment, an input shaft 2 and an output shaft 3 are provided for rotation about the common axis A. A first clutch CL1 is disposed between the input shaft 2 and the first ring gear RG1 which is connected with the third planetary carrier C3 so that these gear elements are connected with the input shaft 2 as desired. A second clutch CL2 is provided between the input shaft 2 and the interconnected first and second planetary carrier C1 and C2. Similarly, a third clutch CL3 is provided between the input shaft 2 and the first sun gear S1 which is connected with the seocnd ring gear RG2. The second ring gear RG2 and the first sun gear S1 are associated with a first brake B1 so that they are restrained from rotation by the brake. The first and second planetary carriers C1 and C2 are associated with a second brake B2 and the first and second sun gears S2 and S3 are associated with a third brake B3. Similarly, a fourth brake B4 is provided in association with the first ring gear RG1 and the third planetary carrier C3. The output shaft 3 is connected with the third ring gear RG3.

In the gear mechanism 1, the following relationships are established in the planetary gear sets;

$$N_{RG1} - (1+I_1) N_{C1} + I_1 N_{S1} = 0$$

$$N_{RG2} - (1+I_2) N_{C2} + I_2 N_{S2} = 0$$

$$N_{RG3} - (1-I_3) N_{C3} - I_3 N_{S3} = 0$$

where;

$N_{RG1}$, $N_{RG2}$ and $N_{RG3}$ represents the rotating speeds of the first, second and third ring gears RG1, RG2 and RG3; $N_{C1}$, $N_{C2}$ and $N_{C3}$ represents the rotating speeds of the first, second and third carriers C1, C2 and C3; $N_{S1}$, $N_{S2}$ and $N_{S3}$ represents the rotating speeds of the first, second and third sun gears S1, S2 and S3; and, $I_1$, $I_2$ and $I_3$ represents the ratios of the diameters of the sun gers to those of the ring gears in the planetary geat sets X1, X2 and X3.

Assuming that the specific values of $I_1$, $I_2$ and $I_3$ in the arrangement of FIG. 1A are 0.548, 0.548 and 0.320, respectively, six stages of forward drive and three stages of reverse drive can be obtained as shown in Table 1 in response to selective actuation of the clutches CL1, CL2 and CL3 and the brakes B1, B2 and B3.

Further, with the aforementioned specific values, the rotating speed of each gear element and the load on the teeth thereof can be calculated as shown in Table 1A. In the Table 1A, the character N designates the rotating speed of the associated gear element and W designates the load on the teeth thereof. In Table 1A, the values corresponding to the forward drive stage F4 are not shown because in this stage the planetary gear sets rotate as a unit and the loads on the elements of the gear sets are small as compared with other drive stages.

In Table 1, it should be noted that one or more of the clutches and brakes can be omitted to provide a desired result. For example, only with the first and second clutches CL1 and CL2 and the first, second and third brakes B1, B2 and B3, forward drive stages F2, F3, F4, F5 and F6 and reverse drive stage R3 can be obtained. Similarly, even without the first brake B1, forward drive stages F1, F2, F3 and F4 and reverse drive stages R1, R2 and R3 can be obtained. Even without the first and second brake B1 and B2, it is possible to obtain forward drive stages F1, F2, F3 and F4 and reverse drive stages R1 and R2. Thus, it should be contemplated that the invenion intends to provide at least one of the clutches CL1, CL2 and CL3 and at least one of the brakes B1, B2 and B3.

Table 1

| | CL1 | CL2 | CL3 | B1 | B2 | B3 | B4 | SPEED RATIO |
|---|---|---|---|---|---|---|---|---|
| F1 | | | | O | | O | | 3.25 |
| F2 | | O | | | | O | | 2.10 |
| F3 | O | | | | | O | | 1.47 |
| F4 | O | O | | | | | | 1.00 |
| F5 | O | | | | O | | | 0.79 |
| F6 | | O | | | O | | | 0.51 |
| R1 | | | O | | | | O | −3.79 |
| R2 | | O | | | | | O | −1.34 |
| R3 | | | O | | O | | | −1.05 |

Table 1A

| | | X1 | | | | X2 | | | | X3 | | | | |
|---|---|---|---|---|---|---|---|---|---|---|---|---|---|---|
| A | B | S1 | C1 | RG1 | P1 | S2 | C2 | RG2 | P2 | S3 | C3 | RG3 | PI3 | PO3 |
| F1 | N | 1.00 | 0.65 | 0.45 | −0.86 | 0.0 | 0.65 | 1.00 | 1.57 | 0.0 | 0.45 | 0.31 | 0.45 | −0.45 |
| | W | 2.21 | 4.42 | 2.21 | 2.21 | 2.21 | 4.42 | 2.21 | 2.21 | 3.25 | 6.51 | 3.25 | 3.25 | 3.25 |
| F2 | N | 1.55 | 1.00 | 0.70 | −1.33 | 0.0 | 1.00 | 1.55 | 2.42 | 0.0 | 0.70 | 0.48 | 0.69 | −0.69 |
| | W | 1.43 | 2.86 | 1.43 | 1.43 | 0.78 | 1.57 | 0.78 | 0.78 | 2.10 | 4.20 | 2.10 | 2.10 | 2.10 |
| F3 | N | 2.21 | 1.43 | 1.00 | −1.90 | 0.0 | 1.43 | 2.21 | 3.47 | 0.0 | 1.00 | 0.68 | 0.99 | −0.99 |
| | W | 0.00 | 0.00 | 0.00 | 0.00 | 0.00 | 0.00 | 0.00 | 0.00 | 1.47 | 2.94 | 1.47 | 1.47 | 1.47 |
| F5 | N | 0.0 | 0.65 | 1.00 | 1.57 | 1.82 | 0.65 | 0.0 | −2.86 | 1.82 | 1.00 | 1.26 | −0.81 | 0.81 |
| | W | 0.46 | 0.92 | 0.46 | 0.46 | 0.46 | 0.92 | 0.46 | 0.46 | 0.79 | 1.58 | 0.79 | 0.79 | 0.79 |
| F6 | N | 0.0 | 1.00 | 1.55 | 2.42 | 2.82 | 1.00 | 0.0 | −4.42 | 2.82 | 1.55 | 1.96 | −1.26 | 1.26 |
| | W | 0.35 | 0.70 | 0.35 | 0.35 | 0.30 | 0.60 | 0.30 | 0.30 | 0.51 | 1.02 | 0.51 | 0.51 | 0.51 |
| R1 | N | 1.00 | 0.35 | 0.0 | −1.57 | −0.82 | 0.35 | 1.00 | 2.86 | −0.82 | 0.0 | −0.26 | 0.81 | −0.81 |
| | W | 2.21 | 4.42 | 2.21 | 2.21 | 2.21 | 4.42 | 2.21 | 2.21 | 3.79 | 7.58 | 3.79 | 3.79 | 3.79 |
| R2 | N | 1.00 | 0.00 | −0.55 | −2.42 | −1.82 | 0.00 | 1.00 | 4.42 | −1.82 | −0.55 | −0.96 | 1.26 | −1.26 |
| | W | 0.71 | 1.42 | 0.71 | 0.71 | 0.61 | 1.22 | 0.61 | 0.61 | 1.05 | 2.09 | 1.05 | 1.05 | 1.05 |

Figure 2:
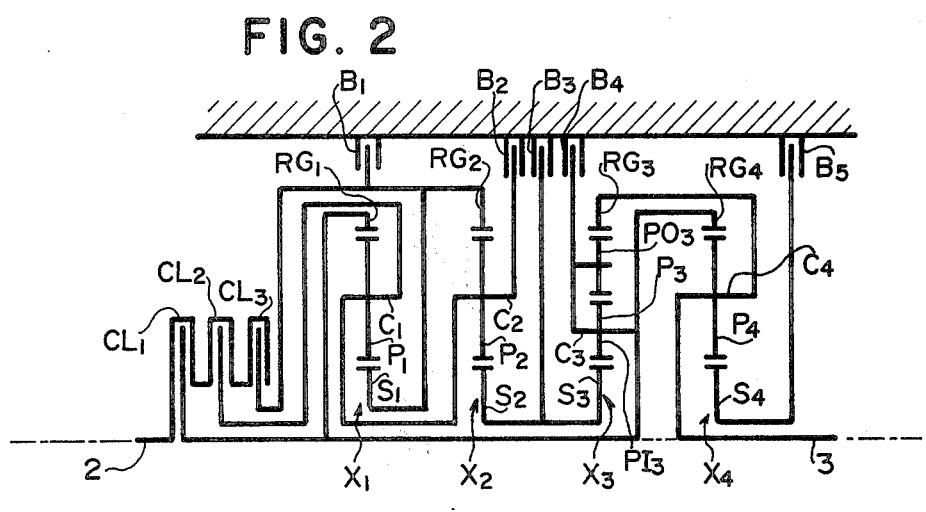
FIG. 2 is a view similar to FIG. 1A but showing a further embodiment of the present invention in which an additional planetary gear set is combined.

FIG. 2 shows another embodiment of the present invention. In this embodiment, the power transmission shown in FIG. 1A is combined with a further set of planetary gear arrangement X-4. The fourth planetary gear set X4 comprises a fourth sun gear S4 which is rotatably supported about the common axis A, a fourth ring gear RG4 co-axial with and rotatable about the fourth sun gear S4 and fourth planetary gears P4 meshing with said fourth sun gear S4 and the fourth ring gear RG4. The fourth planetary gears P4 are rotatably supported by a fourth planetary carrier C4 which is connected with the third ring gear RG3 and the output shaft 3. The fourth ring gear RG4 is connected with the third planetary carrier C3 and the first ring gear RG1. Fifth brake means B5 is provided so that it restrains the fourth sun gear S4 against rotation.

In the fourth planetary gear set X4, the following relationship is established.

$$N_{RG4} - (1 + I_4) N_{C4} + I_4 N_{S4} = 0$$

Where;
$N_{RG4}$ represents the rotating speed of the fourth ring gear;
$N_{C4}$ represents the rotating speed of the fourth planetary carrier;
$N_{S4}$ represents the rotating speed of the fourth sun gear; and
$I_4$ represents the ratio of the diameter of the fourth sun gear to that of the fourth ring gear.

Assuming in this embodiment that the value $I_1$ is 0.548, $I_2$ is 0.548, $I_3$ is 0.320 and $I_4$ is 0.280, the speed changing functions can be obtained through selective actuation of the clutches CL1, CL2, and CL3 and the brakes B1, B2, B3, B4 and B5 as shown in Table 2. In this instance, the rotating speeds and loads on the elements of the planetary gear sets are calculated as shown in Table 2A.

Table 2

|  | CL1 | CL2 | CL3 | B1 | B2 | B3 | B4 | B5 | SPEED RATIO |
|---|---|---|---|---|---|---|---|---|---|
| F1 |  |  | O |  | O |  |  |  | 3.25 |
| F2 |  |  | O |  |  |  |  | O | 2.31 |
| F3 |  | O |  |  | O |  |  |  | 2.10 |
| F4 |  | O |  |  |  |  |  | O | 1.66 |
| F5 | O |  |  |  | O |  |  |  | 1.47 |
| F6 | O |  |  |  |  |  |  | O | 1.28 |
| F7 | O | O |  |  |  |  |  |  | 1.00 |
| F8 | O |  |  |  |  | O |  |  | 0.79 |
| F9 |  | O |  |  |  | O |  |  | 0.51 |
| R1 |  |  |  | O |  |  | O |  | -3.79 |
| R2 |  |  |  | O |  | O |  |  | -1.05 |

In Table 2, it should be noted that one or more of the clutches and breakes can be omitted to provide a desired result. For example, even without the first clutch CL1, forward drive stages F1, F2, F3, F4 and F9 and reverse drive stages R1 and R2 can be obtained.

Table 2A

| | B | X1 | | | | X2 | | | |
|---|---|---|---|---|---|---|---|---|---|
| A | | S1 | C1 | RG1 | P1 | S2 | C2 | RG2 | P2 |
| | N | 1.00 | 0.65 | 0.45 | -0.86 | 0.0 | 0.65 | 1.00 | 1.57 |
| F1 | W | 2.21 | 4.42 | 2.21 | 2.21 | 2.21 | 4.42 | 2.21 | 2.21 |
| | N | 1.00 | 0.71 | 0.55 | -0.71 | 0.17 | 0.71 | 1.00 | 1.30 |
| F2 | W | 2.21 | 4.42 | 2.21 | 2.21 | 2.21 | 4.42 | 2.21 | 2.21 |
| | N | 1.55 | 1.00 | 0.70 | -1.33 | 0.0 | 1.00 | 1.55 | 2.42 |
| F3 | W | 1.43 | 2.86 | 1.43 | 1.43 | 0.78 | 1.57 | 0.78 | 0.78 |
| | N | 1.41 | 1.00 | 0.77 | -1.00 | 0.24 | 1.00 | 1.41 | 1.83 |
| F4 | W | 1.43 | 2.86 | 1.43 | 1.43 | 0.78 | 1.57 | 0.78 | 0.78 |
| | N | 2.21 | 1.43 | 1.00 | -1.90 | 0.0 | 1.43 | 2.21 | 3.47 |
| F5 | W | 0.00 | 0.00 | 0.00 | 0.00 | 0.00 | 0.00 | 0.00 | 0.00 |
| | N | 1.83 | 1.29 | 1.00 | -1.30 | 0.32 | 1.29 | 1.83 | 2.37 |
| F6 | W | 0.00 | 0.00 | 0.00 | 0.00 | 0.00 | 0.00 | 0.00 | 0.00 |
| | N | 0.0 | 0.65 | 1.00 | 1.57 | 1.82 | 0.65 | 0.0 | -2.86 |
| F8 | W | 0.46 | 0.92 | 0.46 | 0.46 | 0.46 | 0.92 | 0.46 | 0.46 |
| | N | 0.0 | 1.00 | 1.55 | 2.42 | 2.82 | 1.00 | 0.0 | -4.42 |
| F9 | W | 0.35 | 0.70 | 0.35 | 0.35 | 0.30 | 0.60 | 0.30 | 0.30 |
| | N | 1.00 | 0.35 | 0.0 | -1.57 | 0.82 | 0.35 | 1.00 | 2.86 |
| R1 | W | 2.21 | 4.42 | 2.21 | 2.21 | 2.21 | 4.42 | 2.21 | 2.21 |
| | N | 1.00 | 0.00 | -0.55 | -2.42 | 1.82 | 0.00 | 1.00 | 4.42 |
| R2 | W | 0.71 | 1.42 | 0.71 | 0.71 | 0.61 | 1.22 | 0.61 | 0.61 |

| | B | X3 | | | | | X4 | | | |
|---|---|---|---|---|---|---|---|---|---|---|
| A | | S3 | C3 | RG3 | P13 | PO3 | S4 | C4 | RG4 | P4 |
| | N | 0.0 | 0.45 | 0.31 | 0.45 | -0.45 | -0.21 | 0.31 | 0.45 | 0.40 |
| F1 | W | 3.25 | 6.51 | 3.25 | 3.25 | 3.25 | 0.0 | 0.00 | 0.00 | 0.00 |
| | N | 0.17 | 0.55 | 0.37 | 0.43 | -0.37 | 0.0 | 0.43 | 0.55 | 0.33 |
| F2 | W | 3.79 | 7.58 | 3.79 | 3.74 | 3.79 | 4.79 | 9.58 | 4.79 | 4.79 |
| | N | 0.07 | 0.7 | 0.48 | 0.69 | -0.69 | -0.32 | 0.48 | 0.70 | 0.62 |
| F3 | W | 2.10 | 4.20 | 2.10 | 2.10 | 2.10 | 0.0 | 0.00 | 0.00 | 0.00 |
| | N | 0.24 | 0.77 | 0.60 | 0.52 | -0.52 | 0.0 | 0.60 | 0.77 | 0.47 |
| F4 | W | 1.34 | 2.68 | 1.34 | 1.34 | 2.34 | 2.34 | 4.68 | 2.34 | 2.34 |
| | N | 0.0 | 1.00 | 0.68 | 0.99 | -0.99 | -0.46 | 0.68 | 1.00 | 0.89 |
| F5 | W | 1.47 | 2.94 | 1.47 | 1.47 | 1.47 | 0.0 | 0.00 | 0.00 | 0.00 |
| | N | 0.32 | 1.00 | 0.78 | 0.67 | -0.67 | 0.0 | 0.78 | 1.00 | 0.61 |
| F6 | W | 0.00 | 0.00 | 0.00 | 0.00 | 1.00 | 1.00 | 2.00 | 1.00 | 1.00 |
| | N | 1.82 | 1.00 | 1.26 | -0.81 | 0.81 | 2.21 | 1.26 | 1.00 | 0.73 |
| F8 | W | 0.79 | 1.58 | 0.79 | 0.79 | 0.79 | 0.0 | 0.00 | 0.00 | 0.00 |

Table 2A-continued

|    |   |       |       |       |       |       |       |       |      |      |
|----|---|-------|-------|-------|-------|-------|-------|-------|------|------|
|    | N | 2.82  | 1.55  | 1.96  | 1.26  | 0.26  | 3.42  | 1.96  | 1.55 | 1.13 |
| F9 | W | 0.51  | 1.02  | 0.51  | 0.51  | 0.51  | 0.0   | 0.00  | 0.00 | 0.00 |
|    | N | −0.82 | 0.0   | −0.26 | 0.81  | −0.81 | −1.21 | −0.26 | 0.0  | 0.73 |
| R1 | W | 3.79  | 7.58  | 3.79  | 3.79  | 3.79  | 0.0   | 0.0   | 0.0  | 0.0  |
|    | N | −1.82 | −0.55 | −0.96 | 1.26  | −1.26 | −2.42 | −0.96 | 0.55 | 1.13 |
| R2 | W | 1.05  | 2.09  | 1.05  | 1.05  | 1.05  | 0.0   | 0.0   | 0.0  | 0.0  |

Figure 3:
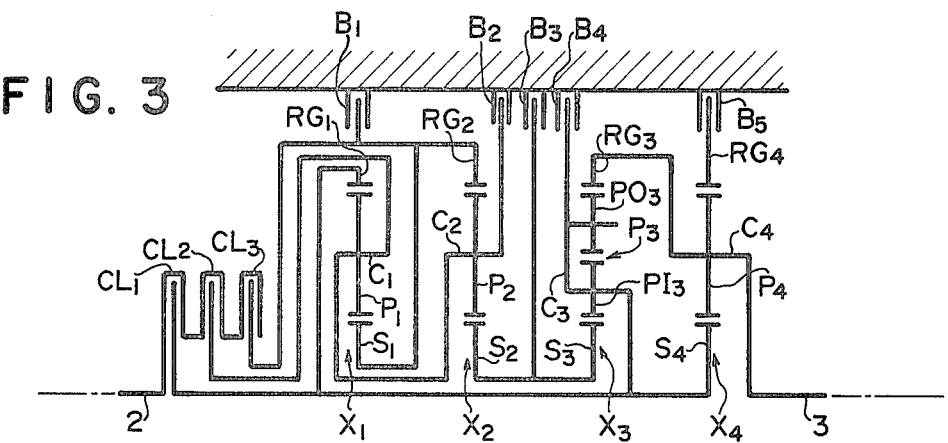
FIG. 3 through 7 are views to FIGS. 1A and 2 but showing further embodiments of the present invention.

FIG. 3 shows a further embodiment of the present invention. In this embodiment, the power transmission shown in FIG. 1A is also combined with a fourth planetary gear set X4 which comprises a fourth sun gear S4 rotatable about the common axis A, a fourth ring gear RG4 co-axial with and rotatable about the fourth sun gear S4 and fourth planetary gears P4 engaging the fourth sun gear S4 and the fourth ring gear RG4. The fourth planetary gears P4 are rotatably supported by a fourth planetary carrier C4 which is connected with the third ring gear RG3 of the third planetary gear set X3 and the output shaft 3. The fourth sun gear S4 is connected with the third planetary carrier C3 of the third gear set X3 and the first ring gear RG1 of the first gear set X1 which are connected through the first clutch CL1 with the input shaft 2. The fourth ring gear RG4 is associated with fourth brake means B5 which serves when actuated to restrain the fourth ring gear RG4 from rotation.

In this case, assuming that the value $I_1$ is 0.548, $I_2$ is 0.548, $I_3$ is 0.320 and $I_4$ is 0.280, eight stages of forward drive and two stages of reverse drive can be obtained as shown in Table 3. Further, the loads and the rotating speeds in the elements of the planetary gear sets in the above stages of operation are calculated as shown in Table 3A. It should be noted in Table 3, that, even without the first clutch CL1 and the first and second brakes B1 and B2, it is possible to obtain four stages of forward drive F1, F2, F3 and F4 and one stage of reverse drive R1. Similarly, even without the fourth and the fifth brakes, it is possible to obtain the forward drive stages F3, F4, F5, F6, F7 and F8 and the reverse drive stages R1 and R2. Without the second clutch CL2, it is possible to obtain the forward drive stages F1, F3, F5 and F7 and the reverse drive stages R1 and R2. Thus, one or more of the clutches CL1, CL2 and CL3 and the brakes B1, B2, B3, B4 and B5 can be omitted to obtain a desired result.

Table 3

|    | CL1 | CL2 | CL3 | B1 | B2 | B3 | B4 | B5 | SPEED RATIO |
|----|-----|-----|-----|----|----|----|----|----|-------------|
| F1 |     |     | O   |    |    |    |    | O  | 18.10       |
| F2 |     | O   |     |    |    |    |    | O  | 9.36        |
| F3 |     |     | O   |    |    |    | O  |    | 3.25        |
| F4 |     | O   |     |    |    |    | O  |    | 2.10        |
| F5 | O   |     |     |    |    |    | O  |    | 1.47        |
| F6 | O   | O   |     |    |    |    |    |    | 1.00        |
| F7 | O   |     |     |    |    | O  |    |    | 0.79        |
| F8 |     | O   |     |    |    | O  |    |    | 0.51        |
| R1 |     |     |     | O  |    |    |    | O  | −3.79       |
| R2 |     |     |     | O  |    | O  |    |    | −1.05       |

Table 3A

| B \ A |   | X1   |      |       |       |       | X2   |       |       |
|-------|---|------|------|-------|-------|-------|------|-------|-------|
|       |   | S1   | C1   | RG1   | P1    | S2    | C2   | RG2   | P2    |
| F1    | N | 1.00 | 0.52 | 0.25  | −1.17 | −0.36 | 0.52 | 1.00  | 2.14  |
|       | W | 2.21 | 4.42 | 2.21  | 2.21  | 2.21  | 4.42 | 2.21  | 2.21  |
| F2    | N | 1.93 | 1.00 | 0.49  | −2.26 | −0.70 | 1.00 | 1.93  | 4.13  |
|       | W | 1.43 | 2.86 | 1.43  | 1.43  | 0.78s | 1.57 | 0.78  | 0.78  |
| F3    | N | 1.00 | 0.65 | 0.45  | −0.86 | 0.0   | 0.65 | 1.00  | 1.57  |
|       | W | 2.21 | 4.42 | 2.21  | 2.21  | 2.21  | 4.42 | 2.21  | 2.21  |
| F4    | N | 1.55 | 1.00 | 0.70  | −1.33 | 0.0   | 1.00 | 1.55  | 2.42  |
|       | W | 1.43 | 2.86 | 1.43  | 1.43  | 0.78  | 1.57 | 0.78  | 0.78  |
| F5    | N | 2.21 | 1.43 | 1.00  | −1.90 | 0.0   | 1.43 | 2.21  | 3.47  |
|       | W | 0.00 | 0.00 | 0.00  | 0.00  | 0.00  | 0.00 | 0.00  | 0.00  |
| F7    | N | 0.0  | 0.65 | 1.00  | 1.57  | 1.82  | 0.65 | 0.0   | −2.86 |
|       | W | 0.46 | 0.92 | 0.46  | 0.46  | 0.46  | 0.92 | 0.46  | 0.46  |
| F8    | N | 0.0  | 1.00 | 1.55  | 2.42  | 2.82  | 1.00 | 0.0   | −4.42 |
|       | W | 0.35 | 0.70 | 0.35  | 0.35  | 0.30  | 0.60 | 0.30  | 0.30  |
| R1    | N | 1.00 | 0.36 | 0.0   | −1.57 | −0.82 | 0.35 | 1.00  | 2.86  |
|       | W | 2.21 | 4.42 | 2.21  | 2.21  | 2.21  | 4.42 | 2.21  | 2.21  |
| R2    | N | 1.00 | 0.00 | −0.55 | −2.42 | −1.82 | 0.00 | 1.00  | 4.42  |
|       | W | 0.77 | 1.42 | 0.71  | 0.71  | 0.61  | 1.22 | 0.61  | 0.61  |

| B \ A |   | X3    |      |      |      |       | X4    |       |       |       |
|-------|---|-------|------|------|------|-------|-------|-------|-------|-------|
|       |   | S3    | C3   | RG3  | P13  | PO3   | S4    | C4    | RG4   | P4    |
| F1    | N | −0.36 | 0.25 | 0.06 | 0.61 | −0.61 | 0.25  | 0.06  | 0.0   | −0.15 |
|       | W | 3.79  | 7.58 | 3.79 | 3.79 | 3.79  | 17.10 | 34.21 | 17.10 | 17.10 |
| F2    | N | −0.70 | 0.49 | 0.11 | 1.18 | −1.18 | 0.49  | 0.11  | 0.0   | −0.30 |
|       | W | 1.34  | 2.68 | 1.34 | 1.34 | 1.34  | 8.36  | 16.72 | 8.36  | 8.36  |
| F3    | N | 0.0   | 0.45 | 0.31 | 0.45 | −0.45 | 0.45  | 0.31  | 0.27  | −0.11 |
|       | W | 3.25  | 6.51 | 3.25 | 3.25 | 3.25  | 0.0   | 0.0   | 0.0   | 0.0   |
| F4    | N | 0.0   | 0.70 | 0.48 | 0.69 | −0.69 | 0.70  | 0.48  | 0.41  | −0.17 |
|       | W | 2.10  | 4.20 | 2.10 | 2.10 | 2.10  | 0.0   | 0.0   | 0.0   | 0.0   |
| F5    | N | 0.0   | 1.00 | 0.68 | 0.99 | −0.99 | 1.00  | 0.68  | 0.59  | −0.25 |
|       | W | 1.47  | 2.94 | 1.47 | 1.47 | 1.47  | 0.0   | 0.0   | 0.0   | 0.0   |

Table 3A-continued

|  |  |  |  |  |  |  |  |  |  |  |
|---|---|---|---|---|---|---|---|---|---|---|
|  | N | 1.82 | 1.00 | 1.26 | −0.81 | 0.81 | 1.00 | 1.26 | 1.34 | 0.21 |
| F7 | W | 0.79 | 1.58 | 0.79 | 0.79 | 0.79 | 0.0 | 0.0 | 0.0 | 0.0 |
|  | N | 2.82 | 1.55 | 1.96 | −1.26 | 1.26 | 1.55 | 1.96 | 2.07 | 0.32 |
| F8 | W | 0.51 | 1.02 | 0.51 | 0.51 | 0.51 | 0.0 | 0.0 | 0.0 | 0.0 |
|  | N | −0.82 | 0.0 | −0.26 | 0.81 | −0.81 | 0.0 | −2.26 | −0.34 | −0.21 |
| R1 | W | 3.79 | 7.58 | 3.79 | 3.79 | 3.79 | 0.0 | 0.0 | 0.0 | 0.0 |
|  | N | −1.82 | −0.55 | −0.96 | 1.26 | −1.26 | −0.55 | −0.96 | −1.07 | −0.32 |
| R2 | W | 1.05 | 2.09 | 1.05 | 1.05 | 1.05 | 0.0 | 0.0 | 0.0 | 0.0 |

Figure 4:
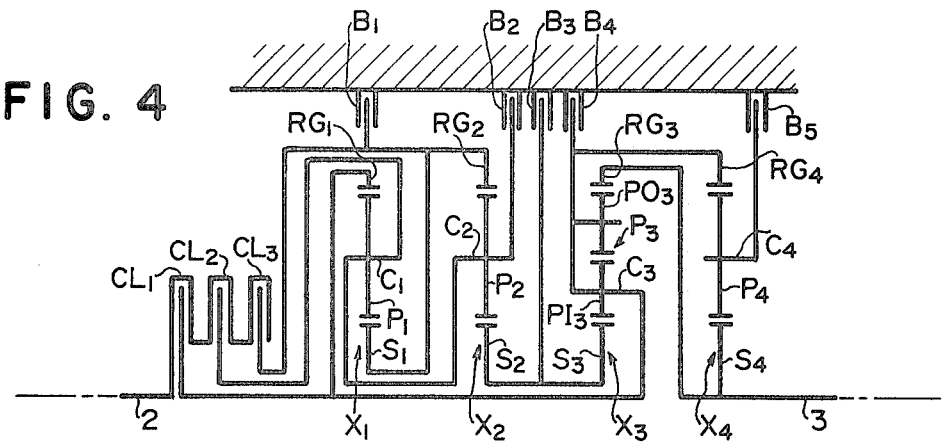

FIG. 4 shows a further embodiment of the present invention in which a fourth planetary gear set X4 is combined with the transmission shown in FIG. 1A. The fourth planetary gear set X4 includes a fourth sun gear S4 rotatable about the common axis A, a fourth ring gear RG4 co-axial with and rotatable about the fourth sun gear S4 and planetary gears P4 engaging the fourth sun gear S4 and the fourth ring gear RG4. The fourth planetary gears P4 are rotatably supported by a fourth planetary carrier C4 which is provided with a fifth brake B5 for restraining it from rotation. The fourth ring gear RG4 is connected with the third planetary carrier C3 which is combined with the fourth brake B4.

The fourth sun gear S4 is connected with the third ring gear RG3 of the third gear set X3 and the output shaft 3. Assuming in this embodiment that the value $I_1$ is 0.548, $I_2$ is 0.548, $I_3$ is 0.320 and $I_4$ is 0.562, six stages of forward drive F1, F2, F3, F4, F5 and F6 and four stages of reverse drive R1, R2, R3 and R4 can be obtained as shown in Table 4. Further, the loads and the rotating speeds in the components of the planetary gear sets in each stage of operation are calculated as shown in Table 4A. In this embodiment, too, one or more of the clutches CL1, CL2 and CL3 and the brakes B1, B2, B3, B4 and B5 can be omitted to obtain a desired result.

Table 4

|  | CL1 | CL2 | CL3 | B1 | B2 | B3 | B4 | B5 | SPEED RATIO |
|---|---|---|---|---|---|---|---|---|---|
| F1 |  |  |  | O |  | O |  |  | 3.25 |
| F2 |  | O |  |  |  | O |  |  | 2.10 |
| F3 | O |  |  |  |  | O |  |  | 1.17 |
| F4 | O | O |  |  |  |  |  |  | 1.00 |
| F5 | O |  |  |  | O |  |  |  | 0.79 |
| F6 |  | O |  |  |  |  |  | O | 0.51 |
| R1 |  |  | O |  |  |  |  | O | −6.48 |
| R2 |  |  | O |  |  |  | O |  | −3.79 |
| R3 |  |  | O |  |  |  |  | O | −2.66 |
| R4 |  |  | O |  | O |  |  |  | −1.05 |

Table 4A

|  |  | X1 | | | | X2 | | | |
|---|---|---|---|---|---|---|---|---|---|
| A |  | S1 | C1 | RG1 | P1 | S2 | C2 | RG2 | P2 |
| F1 | N | 1.00 | 0.65 | 0.45 | −0.86 | 0.0 | 0.65 | 1.0 | 1.57 |
|  | W | 2.21 | 4.42 | 2.21 | 2.21 | 2.21 | 4.42 | 2.21 | 2.21 |
| F2 | N | 1.55 | 1.00 | 0.70 | −1.33 | 0.0 | 1.00 | 1.55 | 2.42 |
|  | W | 1.43 | 2.86 | 1.43 | 1.43 | 0.78 | 1.57 | 0.78 | 0.78 |
| F3 | N | 2.21 | 1.43 | 1.00 | −1.90 | 0.0 | 1.43 | 2.21 | 3.47 |
|  | W | 0.00 | 0.00 | 0.00 | 0.00 | 0.00 | 0.00 | 0.00 | 0.00 |
| F5 | N | 0.0 | 0.65 | 1.00 | 1.57 | 1.82 | 0.65 | 0.0 | −2.86 |
|  | W | 0.46 | 0.92 | 0.46 | 0.46 | 0.46 | 0.92 | 0.46 | 0.46 |
| F6 | N | 0.0 | 1.00 | 1.55 | 2.42 | 2.82 | 1.00 | 0.0 | −4.42 |
|  | W | 0.35 | 0.70 | 0.35 | 0.35 | 0.30 | 0.60 | 0.30 | 0.30 |
| R1 | N | 1.00 | 0.41 | 0.09 | −1.43 | −0.67 | 0.41 | 1.00 | 2.61 |
|  | W | 2.21 | 4.42 | 2.21 | 2.21 | 2.21 | 4.42 | 2.21 | 2.21 |
| R2 | N | 1.00 | 0.35 | 0.0 | −1.57 | −0.82 | 0.36 | 1.00 | 2.86 |
|  | W | 2.21 | 4.42 | 2.21 | 2.21 | 2.21 | 4.42 | 2.21 | 2.21 |
| R3 | N | 2.44 | 1.00 | 0.21 | −3.49 | −1.63 | 1.00 | 2.44 | 6.37 |
|  | W | 1.43 | 2.86 | 1.43 | 1.43 | 0.78 | 1.57 | 0.78 | 0.78 |
| R4 | N | 1.00 | 0.00 | −0.55 | −2.42 | −1.82 | 0.00 | 1.00 | 4.42 |
|  | W | 0.71 | 1.42 | 0.71 | 0.71 | 0.61 | 1.22 | 0.61 | 0.61 |

|  |  | X3 | | | | | X4 | | | |
|---|---|---|---|---|---|---|---|---|---|---|
| A |  | S3 | C3 | RG3 | P13 | PO3 | S4 | C4 | RG4 | P4 |
| F1 | N | 0.0 | 0.45 | 0.31 | 0.45 | −0.45 | 0.31 | 0.40 | 0.45 | 0.24 |
|  | W | 3.25 | 6.51 | 3.25 | 3.25 | 3.25 | 0.0 | 0.0 | 0.0 | 0.0 |
| F2 | N | 0.0 | 0.70 | 0.48 | 0.69 | −0.69 | 0.48 | 0.62 | 0.70 | 0.37 |
|  | W | 2.10 | 4.20 | 2.10 | 2.10 | 2.10 | 0.0 | 0.0 | 0.0 | 0.0 |
| F3 | N | 0.0 | 1.00 | 0.68 | 0.99 | −0.99 | 0.68 | 0.88 | 1.00 | 0.53 |
|  | W | 1.47 | 2.94 | 1.47 | 1.47 | 1.47 | 0.0 | 0.0 | 0.0 | 0.0 |
| F5 | N | 1.82 | 1.00 | 1.26 | −0.81 | 0.81 | 1.26 | 1.09 | 1.00 | −0.43 |
|  | W | 0.79 | 1.58 | 0.79 | 0.79 | 0.79 | 0.0 | 0.0 | 0.0 | 0.0 |
| F6 | N | 2.82 | 1.55 | 1.96 | −1.26 | 1.26 | 1.96 | 1.70 | 1.55 | −0.67 |
|  | W | 0.51 | 1.02 | 0.51 | 0.51 | 0.51 | 0.0 | 0.0 | 0.0 | 0.0 |
| R1 | N | −0.67 | 0.09 | −0.15 | 0.74 | −0.74 | −0.15 | 0.00 | 0.09 | 0.40 |
|  | W | 3.79 | 7.58 | 3.79 | 3.79 | 3.79 | 4.79 | 9.58 | 4.79 | 4.79 |
| R2 | N | −0.82 | 0.0 | −0.26 | 0.81 | −0.81 | −0.26 | −0.09 | 0.0 | 0.43 |
|  | W | 3.79 | 7.58 | 3.79 | 3.79 | 3.79 | 0.0 | 0.0 | 0.0 | 0.0 |
| R3 | N | −1.63 | 0.21 | −0.38 | 1.81 | −1.81 | −0.38 | 0.00 | 0.21 | 0.97 |
|  | W | 1.34 | 2.68 | 1.34 | 1.34 | 1.34 | 2.34 | 4.68 | 2.34 | 2.34 |

Table 4A-continued

| | | | | | | | | | |
|---|---|---|---|---|---|---|---|---|---|
| R4 | N | −1.82 | −0.55 | −0.96 | 1.26 | −1.26 | −0.96 | −0.70 | −0.55 | 0.67 |
| | W | 1.05 | 2.09 | 1.05 | 1.05 | 1.05 | 0.0 | 0.0 | 0.0 | 0.0 |

Figure 5:
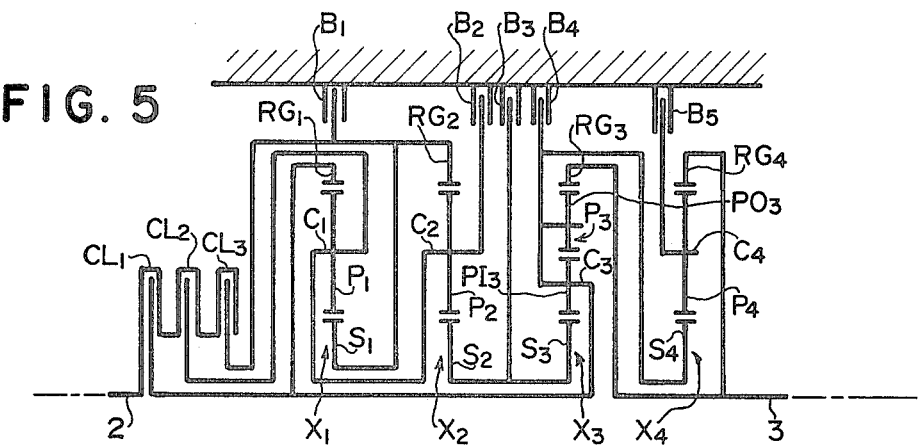

Referring to FIG. 5 which shows a further embodiment of the present invention, the transmission similar to that shown in FIG. 1A is combined with a fourth planetary gear set X4 as in the embodiments shown in FIGS. 2 through 4. The fourth planetary gear set X4 includes a fourth sun gear S4 rotatable about the common axis A, a fourth ring gear RG4 co-axial with and rotatable about the fourth sun gear S4 and fourth planetary gears P4 engaging the fourth sun gear S4 and the fourth ring gear RG4. The fourth planetary gears P4 are rotatably supported by a fourth planetary carrier C4 which is in turn rotatable about the common axis A. In this embodiment, the fourth sun gear S4 is connected with the third planetary carrier C3 and the first ring gear RG1 which are connected through the first clutch CL1 with the input shaft 2 and also combined with the fourth brake B4. The fourth ring gear RG4 is connected with the third ring gear RG3 and the output shaft 3. The fourth planetary carrier C4 is provided with a fifth brake B5 which serves when actuated to restrain the fifth planetary carrier from rotation. Table 5 shows that the six stages of forward drive and four stages of reverse drive can be obtained by the arrangement shown in FIG. 5 through selective actuation of the clutches CL1, CL2 and CL3, and the brakes B1, B2, B3, B4 and B5. Further, the speed reduction ratio obtained in each drive stage is also shown in Table 5. The speed reduction ratio was calculated assuming that the value $I_1$ is 0.548, $I_2$ is 0.548, $I_3$ is 0.320 and $I_4$ is 0.562. Further, the loads and the rotating speed of the components in the transmission in each drive stage are shown in Table 5A. It should be noted in Table 5 that, even when the brakes B2 and B5 are omitted, it is possible to obtain six stages of forward drive and one stage of reverse drive. Similarly, a satisfactory result can be obtained even when the brakes B2 and B4 are omitted. It should also be noted that the third clutch CL3 can also be omitted together with the brakes B2 and B5 or B2 and B4.

Table 5

| | CL1 | CL2 | CL3 | B1 | B2 | B3 | B4 | B5 | SPEED RATIO |
|---|---|---|---|---|---|---|---|---|---|
| F1 | | | | O | | O | | | 3.25 |
| F2 | | O | | | | O | | | 2.10 |
| F3 | O | | | | | O | | | 1.47 |
| F4 | O | O | | | | | | | 1.00 |
| F5 | O | | | | O | | | | 0.79 |
| F6 | | O | | | O | | | | 0.51 |
| R1 | | | | O | | | | O | −12.31 |
| R2 | | O | | | | | | O | −5.51 |
| R3 | | | | O | | | O | | −3.79 |
| R4 | | | | | O | | O | | −1.05 |

Table 5A

| | B | X1 | | | | X2 | | | |
|---|---|---|---|---|---|---|---|---|---|
| A | | S1 | C1 | RG1 | P1 | S2 | C2 | RG2 | P2 |
| F1 | N | 1.00 | 0.65 | 0.45 | −8.86 | 0.0 | 0.65 | 1.00 | 1.57 |
| | W | 2.21 | 4.42 | 2.21 | 2.21 | 2.21 | 4.42 | 2.21 | 2.21 |
| F2 | N | 1.55 | 1.00 | 0.70 | −1.33 | 0.0 | 1.00 | 1.55 | 2.42 |
| | W | 1.43 | 2.86 | 1.43 | 1.43 | 0.78 | 1.57 | 0.78 | 0.78 |
| F3 | N | 2.21 | 1.43 | 1.00 | −1.90 | 0.0 | 1.43 | 2.21 | 3.47 |
| | W | 0.00 | 0.00 | 0.00 | 0.00 | 0.00 | 0.00 | 0.00 | 0.00 |
| F5 | N | 0.0 | 0.65 | 1.00 | 1.57 | 1.82 | 0.65 | 0.0 | −2.86 |
| | W | 0.46 | 0.92 | 0.46 | 0.46 | 0.46 | 0.92 | 0.46 | 0.46 |
| F6 | N | 0.0 | 1.00 | 1.55 | 2.42 | 2.82 | 1.00 | 0.0 | −4.42 |
| | W | 0.35 | 0.70 | 0.35 | 0.35 | 0.30 | 0.60 | 0.30 | 0.30 |
| R1 | N | 1.00 | 0.45 | 0.14 | −1.34 | −0.56 | 0.45 | 1.00 | 2.45 |
| | W | 2.21 | 4.42 | 2.21 | 2.21 | 2.21 | 4.42 | 2.21 | 2.21 |
| R2 | N | 2.24 | 1.00 | 0.32 | −3.00 | −1.25 | 1.00 | 2.24 | 5.47 |
| | W | 1.43 | 2.86 | 1.43 | 1.43 | 0.78 | 1.57 | 0.78 | 0.78 |
| R3 | N | 1.00 | 0.35 | 0.0 | −1.57 | −0.82 | 0.35 | 1.00 | 2.86 |
| | W | 2.21 | 4.42 | 2.21 | 2.21 | 2.21 | 4.42 | 2.21 | 2.21 |
| R4 | N | 1.00 | 0.00 | −0.55 | −2.42 | −1.82 | 0.00 | 1.00 | 4.42 |
| | W | 0.71 | 1.42 | 0.71 | 0.71 | 0.61 | 1.22 | 0.61 | 0.61 |

| | B | X3 | | | | | X4 | | |
|---|---|---|---|---|---|---|---|---|---|
| A | | S3 | C3 | RG3 | PI3 | PO3 | S4 | C4 | RG4 | P4 |
| F1 | N | 0.0 | 0.45 | 0.31 | 0.45 | −0.45 | 0.45 | 0.36 | 0.31 | −0.24 |
| | W | 3.25 | 6.51 | 3.25 | 3.25 | 3.25 | 0.0 | 0.0 | 0.0 | 0.0 |
| F2 | N | 0.0 | 0.70 | 0.48 | 0.69 | −0.69 | 0.70 | 0.56 | 0.48 | −0.37 |
| | W | 2.10 | 4.20 | 2.10 | 2.10 | 0.0 | 0.0 | 0.0 | 0.0 | 0.0 |
| F3 | N | 0.0 | 1.00 | 0.68 | 0.99 | −0.99 | 1.00 | 0.80 | 0.68 | −0.53 |
| | W | 1.47 | 2.94 | 1.47 | 0.47 | 1.47 | 0.0 | 0.0 | 0.0 | 0.0 |
| F5 | N | 1.82 | 1.00 | 1.26 | −1.81 | 0.81 | 1.00 | 1.17 | 1.26 | 0.43 |
| | W | 0.79 | 1.58 | 0.79 | 0.79 | 0.79 | 0.0 | 0.0 | 0.0 | 0.0 |
| F6 | N | 2.82 | 1.55 | 1.96 | −1.26 | 1.26 | 1.55 | 1.81 | 1.96 | 0.67 |
| | W | 0.51 | 1.02 | 0.51 | 0.51 | 0.51 | 0.0 | 0.0 | 0.0 | 0.0 |
| R1 | N | −0.56 | 0.14 | −0.08 | 0.70 | −0.70 | 0.14 | 0.00 | −0.08 | −0.37 |
| | W | 3.79 | 7.58 | 3.79 | 3.79 | 3.79 | 8.52 | 17.04 | 8.52 | 8.52 |

Table 5A-continued

|    |   |       |       |       |       |       |       |       |       |       |
|----|---|-------|-------|-------|-------|-------|-------|-------|-------|-------|
|    | N | −1.25 | 0.32  | −0.18 | 1.56  | −1.56 | 0.32  | 0.00  | −0.18 | −0.83 |
| R2 | W | 1.34  | 2.68  | 1.34  | 1.34  | 1.34  | 4.17  | 8.33  | 4.17  | 4.17  |
|    | N | −0.82 | 0.0   | −0.26 | 0.81  | −0.81 | 0.0   | −0.17 | −0.26 | −0.43 |
| R3 | W | 3.79  | 7.58  | 3.79  | 3.79  | 3.79  | 0.0   | 0.0   | 0.0   | 0.0   |
|    | N | −1.82 | −0.55 | −0.96 | 1.26  | −1.26 | −0.55 | −0.81 | −0.96 | −0.67 |
| R4 | W | 1.05  | 2.09  | 1.05  | 1.05  | 1.05  | 0.0   | 0.0   | 0.0   | 0.0   |

Figure 6:
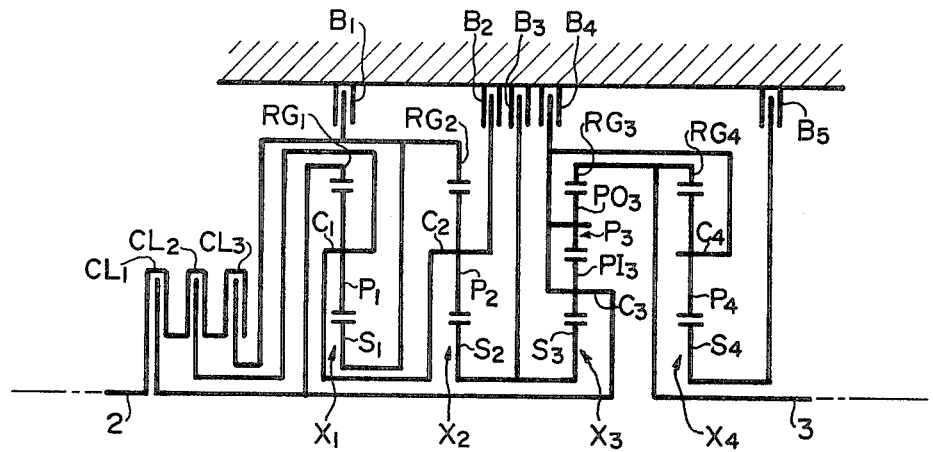

FIG. 6 shows a further embodiment in which a fourth planetary gear set X4 is combined with the transmission mechanism shown in FIG. 1A. The fourth planetary gear set X4 includes a fourth sun gear S4 rotatable about the common axis A, a fourth ring gear RG4 coaxial with and rotatable about the fourth sun gear S4, and fourth planetary gears P4 engaging the fourth sun gear S4 and the fourth ring gear RG4. The fourth planetary gears P4 are rotatably supported by a fourth planetary carrier C4 which is in turn rotatable about the common axis A. In this embodiment, the fourth ring gear RG4 is connected with the third ring gear RG3 and the gear RG4 is connected with the third ring gear RG3 and the output shaft 3. The fourth planetary carrier C4 is connected with the third planetary carrier C3 and the first ring gear RG1 which are connected through the first clutch CL1 with the input shaft 2 and also combined with the fourth brake B4. The fourth sun gear S4 is provided with a fifth brake B5 which serves when actuated to restrain it from rotation.

In Table 6, there is shown that six stages of forward drive and three stages of reverse drive can be obtained through selective actuation of the clutches CL1, CL2 and CL3, and the brakes B1, B2, B3, B4 and B5. The values of speed reduction ratio shown in Table 6 are calculated with the assumption that the values $I_1$, $I_2$, $I_3$ and $I_4$ are the same as in the embodiment shown in FIG. 5. Table 6A shows the loads and the rotating speeds of the components of the transmission in each driving stage. It should also be noted in Table 6 that one or more of the brakes B1, B2, B3, b4 and B5 can be omitted to obtain four or more stages of forward drive and one or more stages of reverse drive.

Table 6

|    | CL1 | CL2 | CL3 | B1 | B2 | B3 | B4 | B5 | SPEED RATIO |
|----|-----|-----|-----|----|----|----|----|----|-------------|
| F1 |     |     |     | O  |    | O  |    |    | 3.25        |
| F2 |     | O   |     |    |    | O  |    |    | 2.10        |
| F3 | O   |     |     |    |    | O  |    |    | 1.47        |
| F4 | O   | O   |     |    |    |    |    |    | 1.00        |
| F5 | O   |     |     |    | O  |    |    |    | 0.79        |
| F6 |     |     | O   |    | O  |    |    |    | 0.51        |
| R1 |     |     |     | O  |    |    | O  |    | −3.79       |
| R2 |     |     |     | O  | O  |    |    |    | −1.05       |
| R3 |     |     |     | O  |    |    |    | O  | −0.72       |

Table 6A

| B  |   | X1    |       |       |       | X2    |       |       |       |
|----|---|-------|-------|-------|-------|-------|-------|-------|-------|
| A  |   | S1    | C1    | RG1   | P1    | S2    | C1    | RG2   | P2    |
|    | N | 1.00  | 0.65  | 0.45  | −0.86 | 0.0   | 0.65  | 1.00  | 1.57  |
| F1 | W | 2.21  | 4.42  | 2.21  | 2.21  | 2.21  | 4.42  | 2.21  | 2.21  |
|    | N | 1.55  | 1.00  | 0.70  | −1.33 | 0.0   | 1.00  | 1.55  | 2.42  |
| F2 | W | 1.43  | 2.86  | 1.43  | 1.43  | 0.78  | 1.57  | 0.78  | 0.78  |
|    | N | 2.21  | 1.43  | 1.00  | −1.90 | 0.0   | 1.43  | 2.21  | 3.47  |
| F3 | W | 0.00  | 0.00  | 0.00  | 0.00  | 0.00  | 0.00  | 0.00  | 0.00  |
|    | N | 0.0   | 0.65  | 1.00  | 1.57  | 1.82  | 0.65  | 0.0   | −2.86 |
| F5 | W | 0.46  | 0.92  | 0.46  | 0.46  | 0.46  | 0.92  | 0.46  | 0.46  |
|    | N | 0.0   | 1.00  | 1.55  | 2.42  | 2.82  | 1.00  | 0.0   | −4.42 |
| F6 | W | 0.35  | 0.70  | 0.35  | 0.35  | 0.30  | 0.60  | 0.30  | 0.30  |
|    | N | 1.00  | 0.35  | 0.0   | −1.57 | −0.82 | 0.35  | 1.00  | 2.86  |
| R1 | W | 2.21  | 4.42  | 2.21  | 2.21  | 2.21  | 4.42  | 2.21  | 2.21  |
|    | N | 1.00  | 0.00  | −0.55 | −2.42 | −1.82 | 0.00  | 1.00  | 4.42  |
| R2 | W | 0.71  | 1.42  | 0.71  | 0.71  | 0.61  | 1.22  | 0.61  | 0.61  |
|    | N | 1.00  | −0.22 | −0.89 | −2.95 | −2.44 | −0.22 | 1.00  | 5.39  |
| R3 | W | 2.21  | 4.42  | 2.21  | 2.21  | 2.21  | 4.42  | 2.21  | 2.21  |

| B  |   | X3    |       |       |       |       | X4    |       |       |       |
|----|---|-------|-------|-------|-------|-------|-------|-------|-------|-------|
| A  |   | S3    | C3    | RG3   | PI3   | PO3   | S4    | C4    | RG4   | P4    |
|    | N | 0.0   | 0.45  | 0.31  | 0.45  | −0.45 | 0.71  | 0.45  | 0.31  | −0.66 |
| F1 | W | 3.25  | 6.51  | 3.25  | 3.25  | 3.25  | 0.0   | 0.0   | 0.0   | 0.0   |
|    | N | 0.0   | 0.70  | 0.48  | 0.69  | −0.69 | 1.10  | 0.70  | 0.48  | −1.02 |
| F2 | W | 2.10  | 4.20  | 2.10  | 2.10  | 2.10  | 0.0   | 0.0   | 0.0   | 0.0   |
|    | N | 0.0   | 1.00  | 0.68  | 0.99  | −0.99 | 1.57  | 1.00  | 0.68  | −1.46 |
| F3 | W | 1.47  | 2.94  | 1.47  | 1.47  | 1.47  | 0.0   | 0.0   | 0.0   | 0.0   |
|    | N | 1.82  | 1.00  | 1.26  | −0.81 | 0.81  | 0.53  | 1.00  | 1.26  | 1.21  |
| F5 | W | 0.79  | 1.58  | 0.79  | 0.79  | 0.79  | 0.0   | 0.0   | 0.0   | 0.0   |
|    | N | 2.82  | 1.55  | 1.96  | −1.26 | 1.26  | 0.82  | 1.55  | 1.96  | 1.87  |
| F6 | W | 0.51  | 1.02  | 0.51  | 0.51  | 0.51  | 0.0   | 0.0   | 0.0   | 0.0   |
|    | N | −0.82 | 0.0   | −0.26 | 0.81  | −0.81 | 0.47  | 0.0   | −0.26 | −1.21 |
| R1 | W | 3.79  | 7.58  | 3.79  | 3.79  | 3.79  | 0.0   | 0.0   | 0.0   | 0.0   |
|    | N | −1.82 | −0.55 | −0.96 | 1.26  | −1.26 | 0.18  | −0.55 | −0.96 | −1.87 |
| R2 | W | 1.05  | 2.09  | 1.05  | 1.05  | 1.05  | 0.0   | 0.0   | 0.0   | 0.0   |
|    | N | −2.44 | −0.89 | −1.38 | 1.53  | −1.53 | 0.0   | −0.89 | −1.38 | 2.27  |

Table 6A-continued

| R3 | W | 3.79 | 7.58 | 3.79 | 3.79 | 3.79 | 3.07 | 6.13 | 3.07 | 3.07 |
|----|---|------|------|------|------|------|------|------|------|------|

Figure 7:
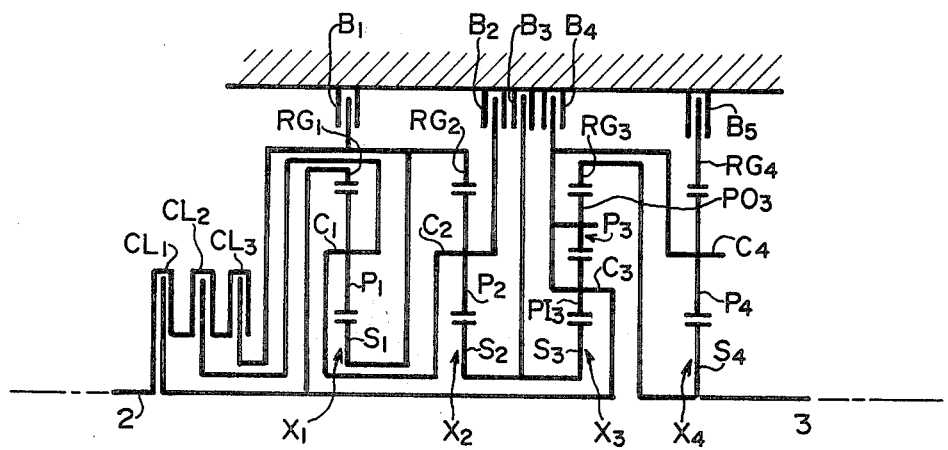

Referring further to FIG. 7 which shows still further embodiment of the present invention, the transmission includes a fourth planetary gear set X4 combined with the transmission mechanism as shown in FIG. 1A. The fourth planetary gear set X4 includes a fourth sun gear S4 rotatable about the common axis A, a fourth ring gear RG4 co-axial with and rotatable about the fourth sun gear S4, and fourth planetary gears P4 engaging the fourth sun gear S4 and the fourth ring gear RG4. The fourth planetary gears P4 are rotatably about the common axis A. In this embodiment, the fourth sun gear S4 is connected with the third ring gear RG3 and the output shaft 3. The fourth planetary carrier C4 is connected with the third planetary carrier C3 and the first ring gear RG1 which are connected through the first clutch CL1 with the input shaft 2. The fourth ring gear RG4 is provided with a fifth brake B5 which serves when actuated to restrain it from rotation.

In Table 7, there are shown drive stages that can be obtained by the arrangement shown in FIG. 7 through selective actuation of the clutches CL1, CL2 and CL3 and the brakes B1, B2, B3, B4 and B5. The values of speed reduction ratio in Table 7 are calculated with the assumption that the values $I_1$, $I_2$, $I_3$ and $I_4$ are the same as in the previous embodiment. In Table 7A, there are shown values of the loads on and the rotating speeds of the components of the transmission in each drive stage. It should be noted in Table 7 that one or more of the brakes B1, B2, B3, B4 and B5 can be omitted to obtain four or more stages of forward drive and one or more stages of reverse drive.

Table 7

|    | CL1 | CL2 | CL3 | B1 | B2 | B3 | B4 | B5 | SPEED RATIO |
|----|-----|-----|-----|----|----|----|----|----|-------------|
| F1 |     |     | O   |    |    | O  |    |    | 3.25        |
| F2 |     | O   |     |    |    | O  |    |    | 2.10        |
| F3 | O   |     | O   |    |    | O  |    |    | 1.47        |
| F4 | O   | O   |     |    |    |    |    |    | 1.00        |
| F5 | O   |     |     |    | O  |    |    |    | 0.79        |
| F6 |     | O   |     |    | O  |    |    |    | 0.51        |
| R1 |     |     |     | O  |    |    | O  |    | −3.79       |
| R2 |     |     |     | O  |    |    |    | O  | −2.07       |
| R3 |     |     |     | O  |    | O  |    |    | −1.05       |

Table 7A

|    |   | B  |    | X1  |    |    |    | X2  |    |
|----|---|----|----|-----|----|----|----|-----|----|
| A  |   | S1 | C1 | RG1 | P1 | S2 | C2 | RG2 | P2 |
|    | N | 1.00 | 0.65 | 0.45 | −0.86 | 0.0 | 0.65 | 1.00 | 1.57 |
| F1 | W | 2.21 | 4.42 | 2.21 | 2.21 | 2.21 | 4.42 | 2.21 | 2.21 |
|    | N | 1.55 | 1.00 | 0.70 | −1.33 | 0.0 | 1.00 | 1.55 | 2.42 |
| F2 | W | 1.43 | 2.86 | 1.43 | 1.43 | 0.78 | 1.57 | 0.78 | 0.78 |
|    | N | 2.21 | 1.43 | 1.00 | −1.90 | 0.0 | 1.43 | 2.21 | 3.47 |
| F3 | W | 0.00 | 0.00 | 0.00 | 0.00 | 0.00 | 0.00 | 0.00 | 0.00 |
| N  | 0.0 | 0.65 | 1.00 | 1.57 | 1.82 | 0.65 | 0.0 | −2.86 |  |
| F5 | W | 0.46 | 0.92 | 0.46 | 0.46 | 0.46 | 0.92 | 0.46 | 0.46 |
|    | N | 0.0 | 1.00 | 1.55 | 2.42 | 2.82 | 1.00 | 0.0 | −4.42 |
| F6 | W | 0.35 | 0.70 | 0.35 | 0.35 | 0.30 | 0.60 | 0.30 | 0.30 |
|    | N | 1.00 | 0.35 | 0.0 | −1.57 | −0.82 | 0.36 | 1.00 | 2.86 |
| R1 | W | 2.21 | 4.42 | 2.21 | 2.21 | 2.21 | 4.42 | 2.21 | 2.21 |
|    | N | 1.00 | 0.24 | −0.17 | −1.84 | −1.14 | 0.24 | 1.00 | 3.36 |
| R2 | W | 2.21 | 4.42 | 2.21 | 2.21 | 2.21 | 4.42 | 2.21 | 2.21 |
|    | N | 1.00 | 0.00 | −0.55 | −2.42 | −1.82 | 0.00 | 1.00 | 4.42 |
| R3 | W | 0.71 | 1.42 | 0.71 | 0.71 | 0.61 | 1.22 | 0.61 | 0.61 |

|    |   | B  |    | X3  |     |     |    | X4  |     |
|----|---|----|----|-----|-----|-----|----|-----|-----|
| A  |   | S3 | C3 | RG3 | P13 | P04 | S4 | C4  | RG4 | P4 |
|    | N | 0.0 | 0.45 | 0.31 | 0.45 | −0.45 | 0.31 | 0.45 | 0.53 | 0.37 |
| F1 | W | 3.25 | 6.51 | 3.25 | 3.25 | 3.25 | 0.0 | 0.0 | 0.0 | 0.0 |
|    | N | 0.0 | 0.70 | 0.48 | 0.69 | −0.69 | 0.48 | 0.70 | 0.83 | 0.57 |
| F2 | W | 2.10 | 4.20 | 2.10 | 2.10 | 2.10 | 0.0 | 0.0 | 0.0 | 0.0 |
|    | N | 0.0 | 1.00 | 0.68 | 0.99 | −0.99 | 0.68 | 1.00 | 1.18 | 0.82 |
| F3 | W | 1.47 | 2.94 | 1.47 | 1.47 | 1.47 | 0.0 | 0.0 | 0.0 | 0.0 |
|    | N | 1.82 | 1.00 | 1.26 | −0.81 | 0.81 | 1.26 | 1.00 | 0.85 | −0.68 |
| F5 | W | 0.79 | 1.58 | 0.79 | 0.79 | 0.79 | 0.0 | 0.0 | 0.0 | 0.0 |
|    | N | 2.82 | 1.55 | 1.96 | −1.26 | 1.26 | 1.96 | 1.55 | 1.32 | −1.05 |
| F6 | W | 0.51 | 1.02 | 0.51 | 0.51 | 0.51 | 0.0 | 0.0 | 0.0 | 0.0 |
|    | N | −0.82 | 0.0 | −0.26 | 0.81 | −0.81 | −0.26 | 0.0 | 0.15 | 0.68 |
| R1 | W | 3.79 | 7.58 | 3.79 | 3.79 | 3.79 | 0.0 | 0.0 | 0.0 | 0.0 |
|    | N | −1.14 | −0.17 | −0.48 | 0.96 | −0.96 | −0.48 | −0.17 | 0.0 | 0.80 |
| R2 | W | 3.79 | 7.58 | 3.79 | 3.79 | 3.79 | 3.07 | 6.13 | 3.07 | 3.07 |
|    | N | −1.82 | −0.55 | −0.96 | 1.26 | −1.26 | −0.96 | −0.55 | −0.32 | 1.05 |
| R3 | W | 1.05 | 2.09 | 1.05 | 1.05 | 1.05 | 0.0 | 0.0 | 0.0 | 0.0 |

The invention has thus been shown and described with reference to specific examples, however, it should be noted that the invention is in no way limited to the illustrated structures but changes and modifications may be made without departing from the scope of the appended claims.

We claim:

1. Power transmission means for a motor driven vehicle, which comprises an input shaft and an output shaft rotatable about a common axis; a gear mechanism including a first planetary gear set having a first sun gear rotatably supported about said common axis, a first ring gear co-axial with and rotatable about said first sun gear and first planetary gear means including first planetary gears engaging the first sun gear and the first ring gear and a first planetary carrier supporting said first planetary gears and rotatable about said common axis; a second planetary gear set having a second sun gear rotatably supported about said common axis, a second ring gear co-axial with and rotatable about said second sun gear and connection with said first sun gear and second planetary gear means including second planetary gears engaging the second sun gear and the second ring gear and a second planetary carrier rotatably supporting said second planetary gears, said second planetary carrier being connected with the first planetary carrier; and a third planetary gear set having a third sun gear rotatably supported about said common axis and connected with said second sun gear, a third ring gear co-axial with and rotatable about said third sun gear and connected with said output shaft, and third planetary gear means including inner third planetary gears engaging the third sun gear, outer third planetary gears engaging the inner third planetary gears and the third ring gear, and a third planetary carrier rotatable about said common axis and rotatably supporting said inner and outer third planetary gears, said third planetary carrier being connected with first ring gear; clutch means for selectively coupling the first ring gear, the first planetary carrier and the first sun gear with said input shaft; and brake means actuatable for selectively restraining the first sun gear, the second planetary carrier, the second sun gear and the third planetary carrier from rotation.

2. Power transmission means in accordance with claim 1 in which said clutch means includes a first clutch for selectively connecting the first ring gear with the input shaft, a second clutch for selectively connecting the first planetary carrier with the input shaft and a third clutch for selectively connecting the first sun gear with the input shaft, and said brake means includes a brake for selective engagement with said second and third sun gears and a brake for selective engagement with the third planetary carrier.

3. Power transmission means in accordance with claim 2 in which sid brake means further comprises a brake for selective engagement with said first and second planetary carriers.

4. Power transmission means in accordance with claim 2 in which said brake means further comprises a brake for selective engagement with said first sun gear.

5. Power transmission means in accordance with claim 2 in which said brake means further includes a brake for selective engagement with said first sun gear and a brake for selective engagement with said first and second planetary carriers.

6. Power transmission means in accordance with claim 1 which further comprises a fourth planetary gear set including a fourth sun gear rotatable about said common axis, a fourth ring gear co-axial with and rotatable about said fourth sun gear, fourth planetary gears engaging the fourth sun gear and the fourth ring gear, and a fourth planetary carrier rotatably supporting the fourth planetary gears, said fourth ring gear being connected with the third planetary carrier, said fourth planetary carrier being connected with the third ring gear and the output shaft, and further brake means for selectively restraining said fourth sun gear from rotation.

7. Power transmission means in accordance with claim 6 in which said clutch means includes a first clutch for connecting the first ring gear with the input shaft, a second clutch for connecting the first planetary carrier with the input shaft and a third clutch for connecting the first sun gear with the input shaft, and said brake means includes a brake for selective engagement with the third planetary carrier.

8. Power transmission means in accordance with claim 7 in which said brake means includes a brake for selective engagement with said second and third sun gears.

9. Power transmission means in accordance with claim 7 in which said brake means includes a brake for selective engagement with said first and second planetary carriers.

10. Power transmission means in accordance with claim 7 in which said brake means includes a brake for selective engagement with said first sun gear.

11. Power transmission means in accordance with claim 7 in which said brake means includes a brake for selective engagement with said first and second planetary carriers and a third brake for selective engagement with said second and third sun gears.

12. Power transmission means in accordance with claim 7 in which said brake means includes brake for selective engagement with said first sun gear and a brake for selective engagement with said second and third sun gears.

13. Power transmission means in accordance with claim 7 in which said brake means includes a brake for selective engagement with said first sun gear and a brake for selective engagement with said first and second planetary carriers.

14. Power transmission means in accordance with claim 7 in which said brake means includes a brake for selective engagement with said second and third sun gears.

15. Power transmission means in accordance with claim 6 in which said clutch means includes a clutch for selectively connecting the first ring gear with the input shaft and a clutch for selectively connecting the first sun gear with the input shaft, and said brake means includes a brake for selective engagement with the third planetary carrier and a brake for selective engagement with said first sun gear.

16. Power transmission means in accordance with claim 15 in which said brake means includes a brake for selective engagement with said second and third sun gears.

17. Power transmission means in accordance with claim 15 in which said brake means includes a brake for selective engagement with said first and second planetary carriers.

18. Power transmission means in accordance with claim 15 in which said brake means includes a brake for selective engagement with said first and second planetary carriers and a brake for selective engagement with said second and third sun gears.

19. Power transmission means in accordance with claim 6 in which said clutch means includes a clutch for selectively connecting the first ring gear with the input shaft and a clutch for connecting the first sun gear with the input shaft and said brake means includes a brake for selective engagement with said second and third sun gears and a brake for selective engagement with the third planetary carrier.

20. Power transmission means in accordance with claim 19 in which said brake means includes a brake for selective engagement with said first and second planetary carriers.

21. Power transmission means in accordance with claim 6 in which said clutch means includes a clutch for selectively connecting the first planetary carrier with the input shaft and a clutch for selectively connecting the first sun gear with the input shaft, and said brake means includes a brake for selective engagement with said first sun gear and a brake for selective engagement with the third planetary carrier.

22. Power transmission means in accordance with claim 21 in which said brake means includes a brake for selective engagement with said second and third sun gears.

23. Power transmission means in accordance with claim 21 in which said brake means includes a brake for selective engagement with said first and second planetary carriers.

24. Power transmission means in accordance with claim 21 in which said brake means includes a brake for selective engagement with said first and second planetary carriers and a brake for selective engagement with said second and third sun gears.

25. Power transmission means in accordance with claim 6 in which said clutch means includes a clutch for selectively connecting the first planetary carrier with the input shaft and a clutch for selectively connecting the first sun gear with the input shaft, and said brake means includes a brake for selective engagement with said second and third sun gears and a brake for selective engagement with the third planetary carrier.

26. Power transmission means in accordance with claim 25 in which said brake means includes a brake for selective engagement with said first and second planetary carriers.

27. Power transmission means in accordance with claim 1 which further comprises a fourth planetary gear set including a fourth sun gear rotatable about said common axis, a fourth ring gear co-axial with and rotatable about said fourth sun gear, fourth planetary gears engaging the fourth sun gear and the fourth ring gear, and a fourth planetary carrier rotatably supporting the fourth planetary gears, said fourth sun gear being connected with the first ring gear and the third planetary carrier, said fourth planetary carrier being connected with the third ring gear and the output shaft, and further brake means for selectively restraining said fourth ring gear from rotation.

28. Power transmission means in accordance with claim 27 in which said clutch means includes a first clutch for selectively connecting the first ring gear with the input shaft, a second clutch for selectively connecting the first planetary carrier with the input shaft and a third clutch for selectively connecting first sun gear with the input shaft, and said brake means includes a brake for selective engagement with said second and third sun gears and a brake for selective engagement with the third planetary carrier.

29. Power transmission means in accordance with claim 38 in which said brake means includes a brake for selective engagement with said first and second planetary carriers.

30. Power transmission means in accordance with claim 28 in which said brake means includes a brake for selective engagement with said first sun gear.

31. Power transmission means in accordance with claim 28 in which said brake means includes a brake for selective engagement with said first sun gear and a brake for selective engagement with said first and second planetary carriers.

32. Power transmission means in accordance with claim 1 which further comprises a fourth planetary gear set including a fourth sun gear rotatable about said common axis, a fourth ring gear co-axial with and rotatable about said fourth sun gear, fourth planetary gears engaging the fourth sun gear and the fourth ring gear, and a fourth planetary carrier rotatably supporting the fourth planetary gears, said fourth sun gear being connected with the third ring gear and the output shaft, said fourth ring gear being connected with the third planetary carrier and the first ring gear, and further brake means for selectively restraining said fourth planetary carrier from rotation.

33. Power transmission means in accordance with claim 32 in which said clutch means includes a first clutch for connecting the first ring gear with the input shaft, a second clutch for connecting the first planetary carrier with the input shaft, and a third clutch for connecting the first sun gear with the input shaft, and said brake means a brake for selective engagement with said second and third sun gears.

34. Power transmission means in accordance with claim 33 in which said brake means includes a brake for selective engagement with the third planetary carrier.

35. Power transmission means in accordance with claim 33 in which said brake means includes a brake for selective engagement with said first and second planetary carriers.

36. Power transmission means in accordance with claim 33 in which said brake means includes a brake for selective engagement with said first and second planetary carriers and a brake for selective engagement with the third planetary carrier.

37. Power transmission means in accordance with claim 33 in which said brake means includes a brake for selective engagement with said first sun gear.

38. Power transmission means in accordance with claim 37 in which said brake means includes a brake for selective engagement with the third planetary carrier.

39. Power transmission means in accordance with claim 33 in which said brake means includes a brake for selective engagement with said first sun gear and a brake for selective engagement with said first and secondary planetary carriers.

40. Power transmission means in accordance with claim 39 in which said brake means includes a brake for selective engagement with the third planetary carrier.

41. Power transmissin means in accordance with claim 32 in which said clutch means includes a first clutch for connecting the first ring gear with the input shaft and a second clutch for connecting the first planetary carrier with the input shaft, and said brake means includes a brake for selective engagement with said first sun gear and a brake for selective engagement with said second and third sun gears.

42. Power transmission means in accordance with claim 1 which further comprises a fourth planetary gear set including a fourth sun gear rotatable about said common axis, a fourth ring gear co-axial with and rotatable about said fourth sun gear, fourth planetary gears engaging the fourth sun gear and the fourth ring gear, and a fourth planetary carrier rotatably supporting the fourth planetary gears, said fourth sun gear being connected with the third planetary carrier, said fourth ring gear being connected with the third ring gear and the output shaft, and further brake means for selectively restraining said fourth planetary carrier from rotation.

43. Power transmission means in accordance with claim 42 in which said clutch means includes a first clutch for connecting the first ring gear with the input shaft, a second clutch for connecting the first planetary carrier with the input shaft and a third clutch for connecting the first sun gear with the input shaft, and said brake means includes a brake for selective engagement with said second and third sun gears.

44. Power transmission means in accordance with claim 43 in which said brake means includes a brake for selective engagement with the third planetary carrier.

45. Power transmission means in accordance with claim 43 in which said brake means includes a brake for selective engagement with said first and second planetary carriers.

46. Power transmission means in accordance with claim 43 in which said brake means includes a brake for selective engagement with said first and second plantary carriers and a brake for selective engagement with the third planetary carrier.

47. Power transmission means in accordance with claim 43 in which said brake means includes a brake for selective engagement with said first sun gear.

48. Power transmission means in accordance with claim 47 in which said brake means includes a brake for selective engagement with the third planetary carrier.

49. Power transmission means in accordance with claim 47 in which said brake means includes a brake for selective engagement with said first and second planetary carriers.

50. Power transmission means in accordance with claim 47 in which said brake means includes a brake for selective engagement with said first and second planetary carriers and a brake for selective engagement with the third planetary carrier.

51. Power transmission means in accordance with claim 42 in which said clutch means includes a first clutch for connecting the first ring gear with the input shaft and a second clutch for connecting the first planetary carrier with the input shaft, and said brake means includes a brake for selective engagement with said first sun gear and a brake for selective engagement with said second and third sun gears.

52. Power transmission means in accordance with claim 1 which further comprises a fourth planetary gear set including a fourth sun gear rotatable about said common axis, a fourth ring gear co-axial with and rotatable about said fourth sun gear, fourth planetary gears engaging the fourth sun gear and the fourth ring gear, and a fourth planetary carrier rotatably supporting the fourth planetary gears, said fourth ring gear being connected with the third ring gear and the output shaft, said fourth planetary carrier being connected with the third planetary carrier, and further brake means for selectively restraining said fourth sun gear from rotation.

53. Power transmission means in accordance with claim 52 in which said clutch means includes a first clutch for connecting the first ring gear with the input shaft, a second clutch for connecting the first planetary carrier with the input shaft and a third clutch for connecting the first sun gear with the input shaft, and said brake means includes a brake for selective engagement with said second and third sun gears and a brake for selective engagement with the third planetary carrier.

54. Power transmission means in accordance with claim 53 in which said brake means includes a brake for selective engagement with said first and second planetary carriers.

55. Power transmission means in accordance with claim 53 in which said brake means includes a brake for selective engagement with said first sun gear.

56. Power transmission means in accordance with claim 53 in which said brake means includes a brake for selective engagement with said first sun gear and a brake for selective engagement with said first and second planetary carriers.

57. Power transmission means in accordance with claim 1 which further comprises a fourth planetary gear set including a fourth sun gear rotatable about said common axis, a fourth ring gear co-axial with and rotatable about said fourth sun gear, fourth planetary gears engaging the fourth sun gear and the fourth ring gear, and a fourth planetary carrier rotatably supporting the fourth planetary gears, said fourth sun gear being connected with the third ring gear and the output shaft, said fourth planetary carrier being connected with the third planetary carrier and the first ring gear, and further brake means for selectively restraining said fourth rin gear from rotation.

58. Power transmission means in accordance with claim 57 in which said clutch means includes a first clutch for connecting the first ring gear with the input shaft, a second clutch for connecting the first planetary carrier with the input shaft and a third clutch for connecting the first sun gear with the input shaft, and said brake means includes a brake for selective engagement with said second and third sun gears.

59. Power transmission means in accordance with claim 58 in which said brake means includes a brake for selective engagement with the third planetary carrier.

60. Power transmission means in accordance with claim 58 in which said brake means includes a brake for selective engagement with said first and second planetary carriers.

61. Power transmission means in accordance with claim 58 in which said brake means includes a brake for selective engagement with said first second planetary carriers and a brake for selective engagement with the third planetary carrier.

62. Power transmission means in accordance with claim 58 in which said brake means includes a brake for selective engagement with said first sun gear.

63. Power transmission means in accordance with claim 58 in which said brake means includes a brake for selective engagement with said first sun gear and a brake for selective engagement with the third planetary carrier.

64. Power transmission means in accordance with claim 58 in which said brake means includes a brake for selective engagement with said first sun gear and a brake for selective engagement with said first and second planetary carriers.

65. Power transmission means in accordance with claim 58 in which said brake means includes a brake for selective engagement with said first sun gear, a brake for selective engagement with said first and second planetary carriers and a brake for selective engagement with the third planetary carrier.

* * * * *

UNITED STATES PATENT AND TRADEMARK OFFICE
CERTIFICATE OF CORRECTION

PATENT NO. : 3,999,448

DATED : December 28, 1976

INVENTOR(S) : Noboru Murakami, Koichiro Hirozawa, Kazuo Obara, Koichi Matsuo

It is certified that error appears in the above-identified patent and that said Letters Patent are hereby corrected as shown below:

Claim 1, column 17, line 34, after "with" and before "first ring", insert --said--.

Claim 3, column 17, line 52, change "sid" to --said--.

Claim 12, column 18, line 33, after "includes" and before "brake", insert --a--.

Claim 28, column 19, line 62, after "connecting" and before "first sun gear", insert --the--.

Claim 29, column 19, line 68, change "claim 38" to --claim 28--.

Claim 46, column 21, line 32, change the spelling of "plantary" to --planetary--.

Claim 57, column 22, line 36, change the spelling of "rin" to --ring--.

Claim 61, column 22, line 55, after "first" and before "second", insert --and--.

Signed and Sealed this

Twelfth Day of April 1977

[SEAL]

Attest:

RUTH C. MASON
*Attesting Officer*

C. MARSHALL DANN
*Commissioner of Patents and Trademarks*